(12) United States Patent
Hughes et al.

(10) Patent No.: US 6,979,279 B2
(45) Date of Patent: Dec. 27, 2005

(54) RANGE CONTROL METHOD FOR LEVER SHIFTED COMPOUND TRANSMISSIONS

(75) Inventors: Douglas A. Hughes, Wixom, MI (US); Karen L. Marx, Clawson, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/674,010

(22) Filed: Sep. 29, 2003

(65) Prior Publication Data

US 2005/0066755 A1    Mar. 31, 2005

(51) Int. Cl.[7] .................. B60K 41/04; G06F 17/00; G06F 19/00; G06F 7/00
(52) U.S. Cl. .................. 477/115; 701/56; 701/62
(58) Field of Search .................. 477/115, 97, 902; 701/50, 54, 57, 62, 55, 56, 61, 51

(56) References Cited

U.S. PATENT DOCUMENTS

| | | | |
|---|---|---|---|
| 4,463,842 A * | 8/1984 | Redzinski | 477/63 |
| 5,416,698 A * | 5/1995 | Hutchison | 701/51 |
| 5,609,547 A * | 3/1997 | Matsushita et al. | 477/110 |
| 5,738,194 A | 4/1998 | Hughes | |
| 5,882,277 A * | 3/1999 | Iizuka | 477/125 |
| 5,979,258 A * | 11/1999 | Nakano | 74/336 R |
| 6,085,606 A | 7/2000 | Stine et al. | |
| 6,128,974 A | 10/2000 | Hughes | |
| 6,175,797 B1 * | 1/2001 | Iizuka | 701/51 |
| 6,319,171 B1 | 11/2001 | Hughes et al. | |
| 6,324,928 B1 | 12/2001 | Hughes | |
| 6,358,183 B1 | 3/2002 | Hughes et al. | |
| 6,361,473 B1 | 3/2002 | Mason et al. | |
| 6,364,810 B1 | 4/2002 | Hughes | |
| 6,409,628 B1 * | 6/2002 | Kuras | 477/69 |
| 6,520,889 B1 | 2/2003 | Hughes et al. | |

FOREIGN PATENT DOCUMENTS

JP    2001248720 A  *  9/2001 ........... F16H 61/02

\* cited by examiner

Primary Examiner—Tisha Lewis
(74) Attorney, Agent, or Firm—Brooks Kushman P.C.

(57) ABSTRACT

A controller-assisted, manually shifted transmission system having a control system and method for controlling automatic range shifts are disclosed. Automatic range shifts are determined by control logic utilizing predetermined logic rules to evaluate transmission system criteria. The control logic determines a set of potential target gear ratios. Engine overspeed tests evaluate the set of potential target gear ratios in combination with the transmission system criteria. The appropriate range shift is determined and executed based on the selected target gear ratio.

21 Claims, 3 Drawing Sheets

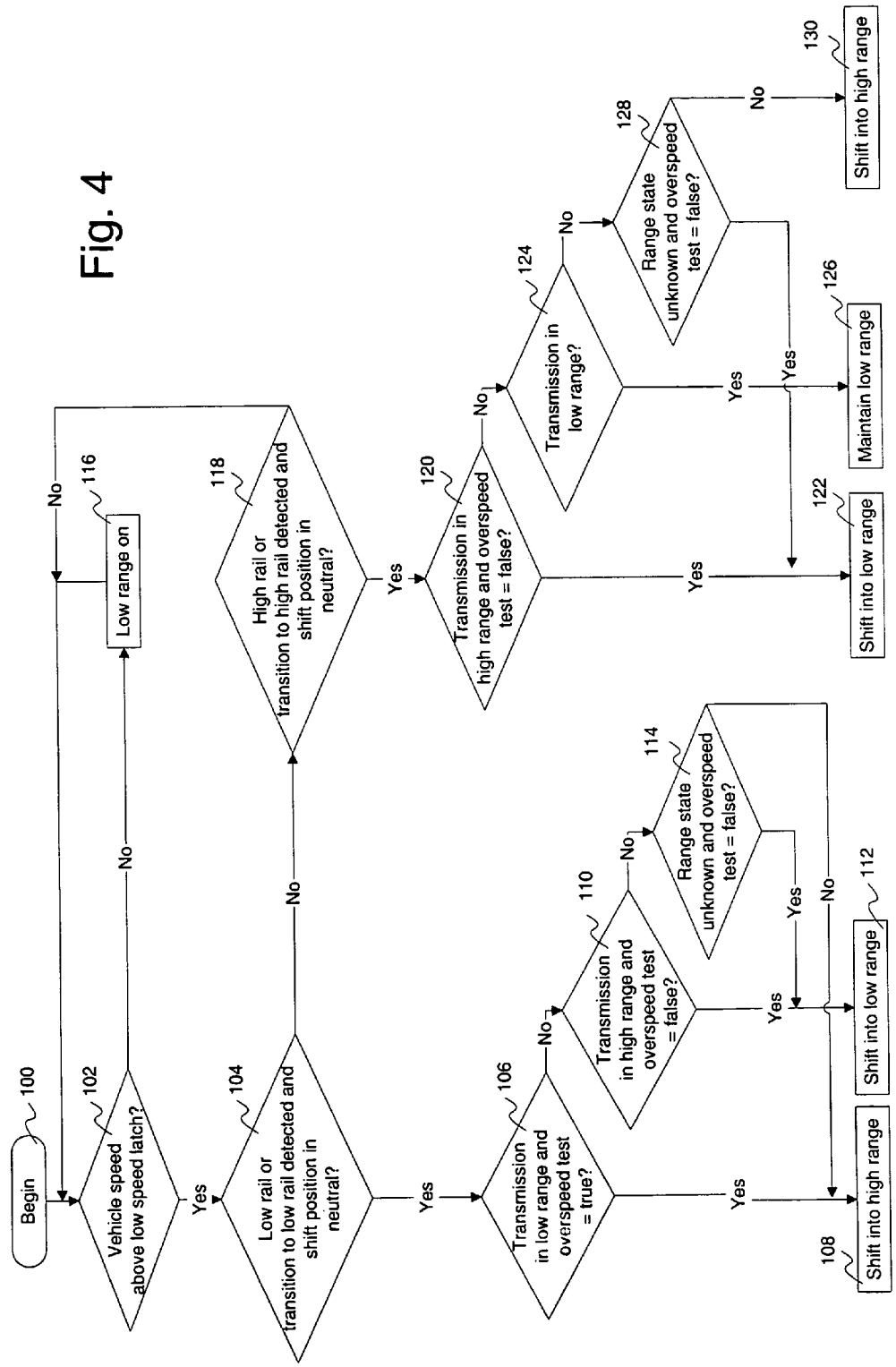

RANGE CONTROL METHOD FOR LEVER SHIFTED COMPOUND TRANSMISSIONS

BACKGROUND OF THE INVENTION

1. Field of the Invention

The present invention relates to a system and method for controlling automatically implemented range shifting in a compound transmission having a main section shifted by a manually operated shift lever. In particular, the present invention relates to a transmission control system and method for automatic range shifting that selects and initiates a range shift in response to a selected target gear ratio.

2. Background Art

Controller-assisted, compound, manually-shifted, mechanical transmissions are widely known in the field of heavy-duty vehicles, such as transport trucks. Typically, these transmissions include a main section shifted directly or remotely by a manual shift lever and one or more serially connected auxiliary sections. The auxiliary sections are usually shifted by a slave actuator and are either pneumatically, hydraulically, mechanically and/or electrically operated in response to manual operation of one or more switches.

In addition to the operation of various switches, drivers of heavy-duty vehicles must be attentive to various vehicle and driving conditions to properly engage transmission shifts without causing damage to the vehicle. For example, while driving a heavy-duty vehicle, the driver must watch the vehicle speed, the road conditions, operate the shift lever, control a splitter select switch to engage a particular gear ratio, and control a range select switch to toggle between at least a high range and a low range. As such, ensuring proper transmission shifts is a complicated task, especially for the inexperienced driver.

Transmissions having sensors, actuators, and a microprocessor-based controller to automatically assist manual shifting are well known in the art. These transmissions are capable of detecting an intent to shift signal and can reduce driveline torque in response to an intent to shift signal. Some prior art transmissions can sense an intended target gear ratio and consequently synchronize transmission components to engage the target ratio.

Prior art devices with lever or switch position initiated automatic range shifting, while adding conveniences, are not totally satisfactory. Automatic range shifting is generally initiated as the shift lever actuates a fixed position sensor or switch. The lever position at which automatic range shifting is initiated is fixed. For example, as the shift lever is moved into a transition area or band from one leg of an H-shift pattern to a higher leg, it crosses a point and actuates a fixed sensor to cause automatic implementation of a range shift. One example of this range shifting method may be seen by referring to U.S. Pat. No. 5,911,787, which is assigned to applicant's assignee. However, this method for automatic range shifting cannot be used with a repeated H-shift pattern. In addition, prior art devices do not prevent or inhibit non-synchronous shifting with a high degree of reliability. When the vehicle is operating in high range and an operator decides to shift the vehicle into low range at the wrong time, an engine overspeed condition may occur if the operator is not careful.

SUMMARY OF THE INVENTION

In accordance with the present invention, the drawbacks of the prior art are minimized or overcome by providing an improved controller-assisted, manually-shifted, transmission system. More specifically, the transmission system may be a twelve-speed, manually-shifted, transmission that implements a repeated H-shift pattern. One improvement relates to automating range shift decisions to ensure that an appropriate range state is selected.

In carrying out the present invention, a method is provided for determining an appropriate range state based on an automatically selected target gear ratio. The method is initiated by detecting an intent to shift signal. In response to detecting the intent to shift signal, a set of potential target gear ratios is determined. Engine overspeed tests are then executed to verify at least one target gear ratio. The appropriate range state is determined based on the target gear ratio that is verified by the engine overspeed tests. The automatic range shift is controlled so that the determined range state is selected based on the selected target gear ratio.

According to one aspect of the invention, the appropriate range state is selected from at least a high range or a low range. In low range, the gear ratios span from first to sixth gear. In high range, the gear ratios span from seventh to twelfth gear. The H-shift pattern includes two vertical legs making up a low rail and a high rail. There are four engaged shift lever positions wherein one position is reserved for reverse and four gear ratios share each remaining shift position, two in low range and two in high range. A horizontal leg connecting the two vertical legs of the H-shift pattern is the neutral shift lever position. A splitter select switch is operable to toggle between each of two gear ratios in any shift lever position and range state. Generally, the appropriate range state is determined based on a target gear ratio that has been selected from a set of potential target gear ratios. The set of potential target gear ratios is determined based on a shift lever rail position, the position of a splitter select switch, and a shift knob force direction.

The target gear ratio is automatically determined based on the results of engine overspeed tests. The engine overspeed tests evaluate individual gear ratios from the set of potential target gear ratios in combination with several transmission and engine conditions to determine if engine overspeed would occur for that particular gear ratio.

The automated range control procedure is triggered by the detection of an intent to shift signal. The intent to shift signal is formulated based on a detected shift knob force and the shift knob force direction.

According to another aspect of the present invention, a method is provided for selecting an appropriate range state from at least two possible range states in a manually shifted transmission system. A set of transmission system criteria is detected including vehicle speed, a shift lever rail position, a transition to rail position, a shift knob force, a shift knob force direction, and a position of the splitter select switch. An intent to shift signal is formulated based on the shift knob force and the shift knob force direction. When an intent to shift signal is detected, a set of potential target gear ratios is determined and engine overspeed tests are executed. The set of potential target gear ratios is determined based on the shift lever rail position, the position of the splitter select switch, and the shift knob force direction. Engine overspeed tests are then executed to evaluate the set of potential target gear ratios in combination with the set of transmission system criteria in order to select one ratio from the set of potential target gear ratios. An appropriate range state is determined based on the selected target gear ratio. An automatic range shift to the determined range state based on the selected target gear ratio is then initiated.

A manually shifted compound transmission system is also disclosed. The system generally includes a manually operated shift lever, a variety of system inputs, control logic, and a range shift mechanism. A variety of system inputs is used to determine the position and to detect movement of the shift lever and to detect other engine conditions. A position sensor provides a position signal that indicates the position of the shift lever including lateral movement into the transition to high or low rail positions as well as forward or rearward movements. A force threshold detector provides a shift knob force signal indicative of directional forces applied to the shift lever by an operator. A splitter select switch is provided that toggles between high and low splitter ratios. A speed sensor is included for providing signals that indicate engine rotational speed. The control logic receives the input signals from the variety of sensors to formulate an intent to shift signal and to determine the set of potential target gear ratios. The control logic, triggered by an intent to shift signal, executes the engine overspeed tests for the set of potential target gear ratios. The control logic also verifies at least one of the target gear ratios as being appropriate for engine conditions in accordance with the system inputs. An appropriate range state of the transmission system is automatically determined based on the selected target gear ratio. A range shift mechanism shifts the transmission into the appropriate range state as determined by the control logic.

The position signal is operable to indicate a transition to one of at least two possible rail positions including a high rail and a low rail.

The following additional features are applicable to the above methods and system for controlling automatic range shift decisions for determining the appropriate range state and to the manually shifted compound transmission.

A predetermined low speed latch is set at the speed below which low range is always appropriate. The actual vehicle speed is monitored to determine if the vehicle speed is above a low speed latch. If the vehicle speed is above the predetermined low speed latch and the intent to shift signal is detected, the method for controlling automatic range shift decisions, is executed. If the vehicle speed is not above the predetermined low speed latch, the transmission is shifted into low range and the test for vehicle speed above the low speed latch is repeated.

If the shift lever position is on low rail or if the transition to low rail is detected and the shift lever position is in neutral, and the transmission must be in low range and the engine overspeed test indicates a positive result, then the transmission is shifted into high range.

If the shift lever is on the low rail or if a transition to low rail is detected and the shift lever position is in neutral, and the transmission is in high range and the engine overspeed test indicates a negative result, then the transmission is shifted into low range.

Preferably, in determining the appropriate range state, the transmission is shifted into low range if the shift lever position is on low rail or if the transition to low rail is detected and the shift lever position is in neutral. In addition to the aforementioned conditions, if the current range state is unknown and the engine overspeed test indicates a negative result, the transmission is shifted into low range.

If the transmission is currently in low range and the splitter select switch indicates a splitter low position and the engine overspeed test for a first gear ratio indicates a positive result, then the transmission is shifted into high range. The transmission is also shifted into high range if the transmission is currently in low range and the splitter select switch indicates a splitter high position and the engine overspeed test for a second gear ratio indicates a positive result.

If the transmission is currently in high range and the splitter select switch indicates a splitter low position and the engine overspeed test for a first gear ratio indicates a negative result, then the transmission is shifted into low range. The transmission is also shifted into low range if the transmission is in high range and the splitter select switch indicates a splitter high position and the engine overspeed test for a second gear ratio indicates a negative result.

If the current range state is unknown and the splitter select switch indicates a splitter low position and the engine overspeed test for a first gear ratio indicates a negative result, then the transmission is shifted into low range. The transmission is also shifted into low range if the current range state is unknown and the splitter select switch indicates a splitter high position and the gear overspeed test for a second gear ratio indicates a negative result. If the current range state is unknown and neither of the above cases is true, then the transmission is shifted into high range.

According to another aspect of the invention, when determining the appropriate range state, if the shift lever is on high rail or if the transition to high rail is detected, and the shift position is in neutral, and the transmission is in high range, and the engine overspeed test indicates a negative result, then the transmission is shifted into low range.

In accordance with another aspect of the invention, if the shift lever is on high rail or if a transition to high rail is detected and the shift position is in neutral, and the current range state is unknown and the engine overspeed test indicates a negative result, then low range is maintained. If the aforementioned conditions are not satisfied, then the transmission is shifted into high range.

In accordance with another aspect of the invention, if the shift lever is on high rail or if the transition to high rail is detected and the shift position is in neutral, and the current range state is unknown and the engine overspeed test indicates a negative result, then the transmission is shifted into low range. Otherwise, the transmission is shifted into high range.

The above object and other aspects of the present invention are readily apparent from the following detailed description of the best mode for carrying out the invention when taken in connection with the accompanying drawings.

BRIEF DESCRIPTION OF THE DRAWINGS

FIG. 4 is a flow chart of the range control logic for a lever shifted compound transmission.

DETAILED DESCRIPTION OF THE PREFERRED EMBODIMENT(S)

Figure 1:
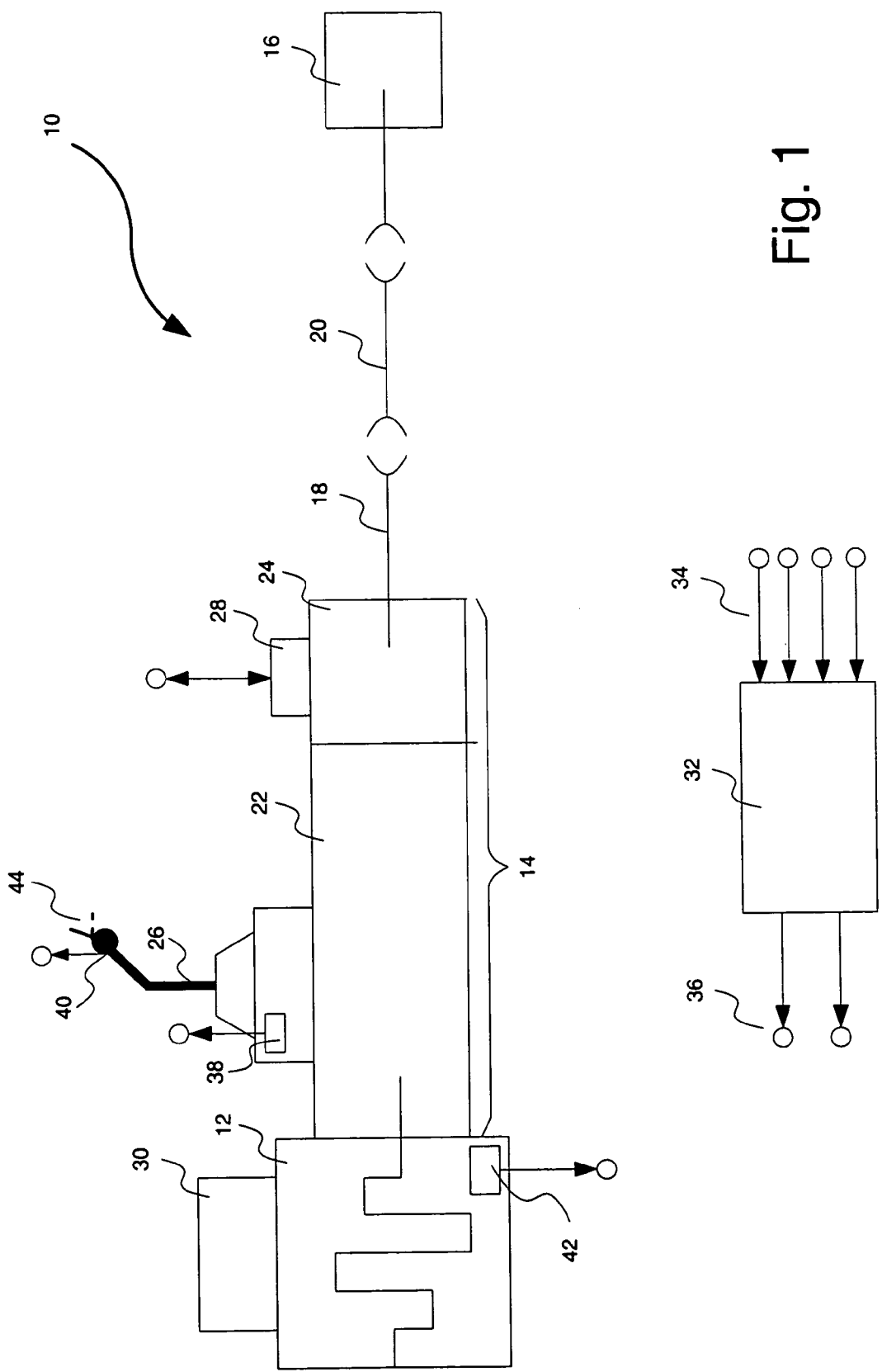
FIG. 1 is a schematic illustration of a controller-assisted, manually shifted compound transmission system.

Referring to FIG. 1, a controller-assisted compound transmission system 10 is illustrated, it is particularly well suited for the range shifting control system and method of the present invention.

The transmission system 10 may be utilized in heavy-duty vehicles and includes an engine 12, typically a diesel engine, a multiple-speed compound transmission 14, and a drive axle assembly 16. The transmission 14 includes an output shaft 18 drivingly coupled to a vehicle drive shaft 20 by universal joints for driving the drive axle assembly 16.

The multiple-speed compound transmission 14 typically includes a main transmission section 22 and an auxiliary splitter or combined splitter-and-range type auxiliary transmission section 24. The main transmission section 22 is a multiple-ratio manually shifted transmission section that is shifted by a manually operated shift lever 26. The range-type auxiliary transmission section 24 is shifted by an auxiliary splitter or splitter-and-range actuator assembly 28.

The engine 12 is preferably electronically controlled and it communicates with a powertrain controller 30. The powertrain controller has control logic 32 for processing input signals 34 and sending output signals 36 to various system actuators.

The transmission system includes sensors for detecting movement of the shift lever 26. A position sensor 38 is operable to detect and send output signals indicative of shift lever position in a shift pattern. A force threshold detector 40 is located within the shift knob of the shift lever 26 for detecting movement and direction of movement of the shift lever. Sensors for detecting engine rotational speed, such as speed sensor 42, are also included. These and various other sensors send input signals 34 to the powertrain controller 30. The control logic 32 of the powertrain controller 30 processes the input signals according to predetermined logic rules for analyzing engine conditions and issuing command output signals 36 to various system actuators.

Figure 2:
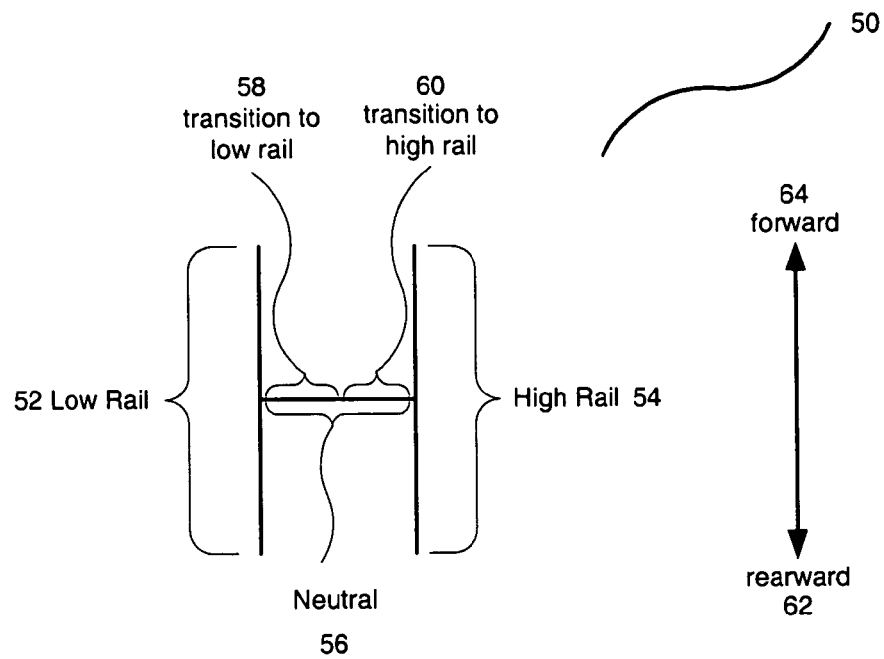
FIG. 2 is a schematic illustration of a repeat H-shift pattern for a preferred embodiment of the transmission.

FIG. 2 illustrates an H-shift pattern 50 having two vertical legs and one connecting horizontal leg for manual shifting of the controller-assisted compound transmission 14 by the manually operated shift lever 26. Briefly, the shift lever 26 is moveable side to side along the horizontal leg, in a lateral direction, to select one of at least two rail positions. The two rail positions include at least a low rail 52 and a high rail 54. The shift lever 26 is also moveable forward and backward in a longitudinal direction to selectively engage and disengage particular gear ratios.

The horizontal leg 56 includes two transition areas including a transition to low rail 58 and a transition to high rail 60. Position sensors detect if the shift lever 26 is in the transition to low rail area or the transition to high rail area. Detection of a transition to a high or low rail position along with the detection of a shift force signal by the force threshold detector 40 are processed by the control logic 32 to generate an intent shift signal.

A lever shift involves a change in main section ratio and is accomplished by moving the shift lever from one shift position to a different shift position. A splitter-only shift such as from a first gear ratio to a second gear ratio does not require the use of the shift lever and is accomplished automatically or in response to the operation of a splitter ratio selector switch 44.

Figure 3:
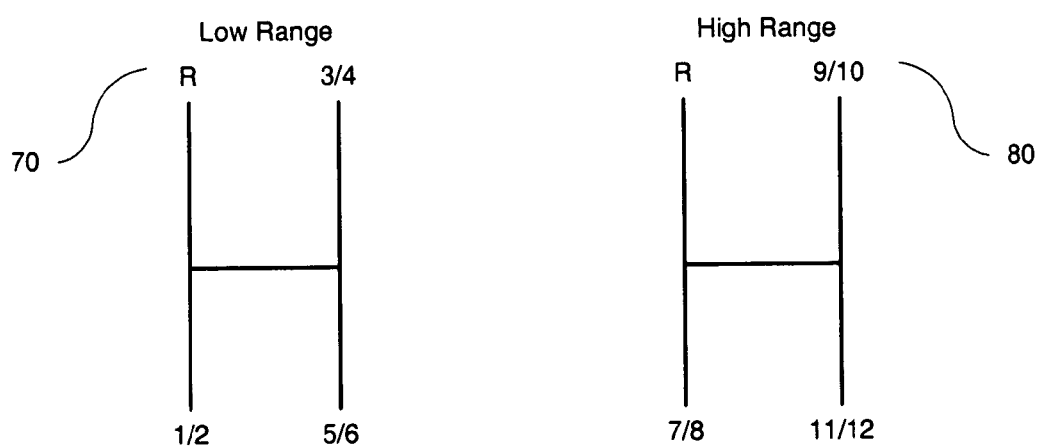
FIG. 3 is a schematic illustration of the low range and a high shift lever positions of the present invention.

In the embodiment illustrated in FIG. 3, the main transmission section 22 is a 3-speed transmission with reverse. The repeat H-shift pattern has four engageable main section ratios. A low range 70 and a high range 80 H-shift pattern is shown wherein the appropriate range state is automatically determined by the control logic 32 based on system input signals 34. Each end of the rail positions represents one of the four shift lever positions. In low range 70, the main section ratios include one for reverse, one for ½, one for ¾, and one for ⅚. In high range 80, the main section ratios include one for reverse, one for ⅞, one for 9/10, and one for 11/12. The splitter ratio select switch 44, which could be manual or automatic, shifts between the gear ratios within each shift lever position.

When an intent to shift signal is detected, the range control logic within the powertrain controller is triggered. A procedure is executed, as shown in FIG. 4, for determining the appropriate range based on the current vehicle and transmission system inputs and more particularly, the target gear ratio.

The range control logic starts at block 100 when an intent to shift signal is detected. The vehicle speed is checked at block 102 to determine whether the vehicle speed is above a low speed latch. The low speed latch is a predetermined vehicle speed below which the speed sensors may not detect vehicle speed with accuracy. If the vehicle speed is not above the low speed latch, the transmission is automatically shifted into low range at block 116. The control logic would then return to block 102 where the vehicle speed would be checked again. However, if the vehicle speed is above the low speed latch at decision block 102, the range control logic moves onto decision block 104.

At decision block 104, it is determined whether the shift lever 26 is in the neutral position 56 and a transition to low rail 58 is detected or if the shift lever 26 is on low rail 52. If this is true, then the procedure goes onto decision block 106 where it is determined if the transmission is in low range 70 and whether the engine overspeed test for a first or second gear indicates a positive result. The engine overspeed test determines if the current output speed will cause an engine overspeed condition for the gear ratio being tested. If this is also true, then the transmission is shifted into high range 80 in order to avoid engine overspeed conditions at block 108.

However, at decision block 106, if the transmission is not in low range 70 and the overspeed test for the first or second gear does not indicate a positive result, then the procedure moves to decision block 110 where it is determined whether the transmission is in high range 80 and the engine overspeed test for a first or second gear indicates a negative result. If the decision at 110 is yes, then the transmission is shifted into low range 70. If the decision at 110 is no, then the procedure moves to decision block 114 where it is determined whether the range state is unknown and the engine overspeed test for a first or second gear indicates a negative result. If decision 114 is yes, then the transmission is shifted into low range 70 at block 112, otherwise the transmission is shifted into high range 80 at block 108.

At decision block 104, if it is determined that the shift lever 26 is not in the neutral position 56 and that the transition to low rail 58 is not detected or that the shift lever 26 is not on low rail 52, then the procedure moves onto decision block 118.

At block 118, it is determined whether the shift lever 26 is in the neutral position 56 and if a transition to high rail 60 is detected or if the shift lever 26 is positioned on high rail 54. If the decision is no, then the procedure is returned to block 102 and the vehicle speed is checked to determine whether the vehicle speed is above the low speed latch. If the decision is yes, then the procedure goes onto decision block 120 where it is determined whether the transmission is in high range 80. It is also determined whether the shift force signal from the force threshold detector 40 used in formulating the intent to shift signal indicates a rearward or forward direction. If a rearward movement 62 is indicated, it is determined whether the engine overspeed test for a fifth or sixth gear indicates a negative result. If a forward movement 64 is indicated, it is determined whether the engine overspeed test for a third or fourth gear indicates a negative result. If a negative result is indicated for any of the above engine overspeed tests, then the transmission is shifted into low range 70 at block 122.

If the decision at block 120 is negative, the procedure moves onto decision block 124 where it is determined whether the transmission is currently in low range. If the decision at block 124 is positive, then the transmission is maintained in low range.

If the decision at block 124 is negative, the procedure moves onto decision block 128. At decision block 128, it is determined whether the range state is unknown. If the shift force signal formulating the intent to shift signal detects rearward movement 62 of the shift lever 26, it is determined whether engine overspeed tests indicate a negative result for fifth or sixth gear ratios. If the intent to shift signal detects forward movement 64 of the shift lever, it is determined whether engine overspeed tests indicate a negative result for third or fourth gear ratios. If either of these conditions is true, then the transmission is shifted into low range 70 at block 122. Otherwise, the transmission is shifted into high range 80 at block 130.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling automatic range shift decisions in selecting an appropriate range from at least two possible ranges in a manually shifted, multiple-ratio vehicular transmission system, each range having a plurality of ratios, the method comprising:
   detecting an intent to shift signal;
   determining a set of potential target gear ratios, in response to detecting the intent to shift signal;
   executing engine overspeed tests to verify at least one of the set of potential target gear ratios;
   determining an appropriate range based on operating variables including the target gear ratio verified by the engine overspeed tests;
   executing an automatic range shift to select the determined range based in part on the target gear ratio when the target gear ratio is not in a current range; and
   determining if the vehicle speed is above a low speed latch; and if the vehicle speed is above the low speed latch, controlling an automatic range shift, otherwise shifting the transmission system into low range.

2. A method for controlling automatic range shift decisions in selecting an appropriate range from at least two possible ranges in a manually shifted, multiple-ratio vehicular transmission system, each range having a plurality of ratios, the method comprising:
   detecting a set of transmission system criteria, the set of transmission system criteria including a vehicle speed, a shift lever rail position, a transition to rail position, a shift knob force, a shift knob force direction, and a position of a splitter select switch;
   detecting an operator's intent to shift signal based on the shift knob force and the shift knob force direction;
   determining a set of potential target gear ratios based on the shift lever rail position, the position of the splitter select switch, and the shift knob force direction;
   executing an engine overspeed test to select one ratio from the set of potential target gear ratios based on the set of transmission system criteria, in response to the detection of the operator's intent to shift signal;
   determining an appropriate range based on the system criteria and selected target gear ratio verified by the engine overspeed test; and
   initiating an automatic range shift for selecting the determined range based on the system criteria and the selected target gear ratio when the target near ratio is not in a current range;
   the determination of an appropriate range comprising determining if the vehicle speed is above a low speed latch; and if the vehicle speed is above the low speed latch, executing automatic range shift decisions, otherwise shifting the transmission system into low range.

3. A method for controlling automatic range shift decisions in selecting an appropriate range from at least two possible ranges in a manually shifted vehicular transmission system, the method comprising:
   detecting a set of transmission system criteria, the set of transmission system criteria including a vehicle speed, a shift lever rail position, a transition to rail position, a shift knob force, a shift knob force direction, and a position of a splitter select switch;
   detecting an operator's intent to shift signal based on the shift knob force and the shift knob force direction;
   determining a set of potential target gear ratios based on the shift lever rail position, the position of the splitter select switch, and the shift knob force direction;
   executing an engine overspeed test to select one ratio from the set of potential target gear ratios based on the set of transmission system criteria, in response to the detection of the operator's intent to shift signal;
   determining an appropriate range based on the selected target gear ratio verified by the engine overspeed test; and
   initiating an automatic range shift for selecting the determined range based on the selected target gear ratio;
   the step of determining the appropriate range comprising shifting the transmission system into high range if a) the shift lever is on low rail or if a transition to low rail is detected and the shift lever position is in neutral, and b) the transmission system is in low range and the engine overspeed test indicates a positive result.

4. A method for controlling automatic range shift decisions in selecting an appropriate range from at least two possible ranges in a manually shifted vehicular transmission system, the method comprising:
   detecting a set of transmission system criteria, the set of transmission system criteria including a vehicle speed, a shift lever rail position, a transition to rail position, a shift knob force, a shift knob force direction, and a position of a splitter select switch;
   detecting an operator's intent to shift signal based on the shift knob force and the shift knob force direction;
   determining a set of potential target gear ratios based on the shift lever rail position, the position of the splitter select switch, and the shift knob force direction;
   executing an engine overspeed test to select one ratio from the set of potential target gear ratios based on the set of transmission system criteria, in response to the detection of the operators intent to shift signal;
   determining an appropriate range based on the selected target gear ratio verified by the engine overspeed test; and
   initiating an automatic range shift for selecting the determined range based on the selected target gear ratio;
   the step of determining an appropriate range comprising shifting the transmission system into low range if a) the shift lever is on low rail or if the transition to low rail is detected and the shift lever position is in neutral, and
b) the transmission system is in high range and the engine overspeed test indicates a negative result.

5. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test; and initiating an automatic range shift for selecting the determined range based on the selected target gear ratio;

the step of determining the appropriate range further comprising shifting the transmission system into low range if a) the shift lever is on low rail or if a transition to low rail is detected and the shift lever position is in neutral, and b) the range is unknown and the engine overspeed test indicates a negative result, otherwise shifting the transmission system into high range.

6. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test;

the at least two possible ranges including a low range and a high range; and detecting a splitter select switch position; and if the transmission system is in low range and a) the splitter select switch indicates a splitter low position and the engine overspeed test for a first gear ratio indicates a positive result, or b) the splitter select switch indicates a high position and the engine overspeed test for a second gear indicates a positive result, then shifting the transmission system into high range.

7. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test;

initiating an automatic range shift for selecting the determined range based on the selected target gear ratio;

the at least two possible ranges including a low range and a high range; and detecting a splitter select switch position; and if the transmission is in high range and a) the splitter select switch indicates a splitter low position and the engine overspeed test for a first gear ratio indicates a negative result, or b) the splitter select switch indicates a splitter high position and the engine overspeed test for a second gear ratio indicates a negative result, then shifting the transmission system into low range.

8. A method for controlling automatic range shift decisions in selecting an appropriate range from at least two possible ranges in a manually shifted vehicular transmission, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test;

initiating an automatic range shift for selecting the determined range based on the selected target gear ratio;

the at least two possible ranges including a low range and a high range; and detecting a splitter select switch position; and if the range state is unknown and a) the splitter select switch indicates a splitter low position and the engine overspeed test for a first gear ratio indicates a negative result, or b) the splitter select switch indicates a splitter high position and the engine overspeed test for a second gear ratio indicates a negative result, then shifting the transmission system into low range, otherwise shifting the transmission system into high range.

9. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test; and initiating an automatic range shift for selecting the determined range based on the selected target gear ratio;

the step of determining the appropriate range comprising shifting the transmission system into low range if a) the shift lever is on high rail or if a transition to high rail is detected and the shift position is in neutral, and b) the transmission system is in high range and the engine overspeed test indicates a negative result.

10. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test; and initiating an automatic range shift for selecting the determined range based on the selected target gear ratio;

the step of determining the appropriate range comprising maintaining the transmission system in low range if a) the shift lever is on high rail or if a transition to high rail is detected and the shift position is in neutral, and b) the transmission system is currently in low range.

11. A method for controlling automatic range shift decisions in selecting an appropriate range from at least two possible ranges in a manually shifted vehicular transmission system, the method comprising:

detecting a set of transmission system criteria, the set of transmission system criteria including a vehicle speed, a shift lever rail position, a transition to rail position, a shift knob force, a shift knob force direction, and a position of a splitter select switch;

detecting an operator's intent to shift signal based on the shift knob force and the shift knob force direction;

determining a set of potential target gear ratios based on the shift lever rail position, the position of the splitter select switch, and the shift knob force direction;

executing an engine overspeed test to select one ratio from the set of potential target gear ratios based on the set of transmission system criteria, in response to the detection of the operator's intent to shift signal;

determining an appropriate range based on the selected target gear ratio verified by the engine overspeed test; and initiating an automatic range shift for selecting the determined range based on the selected target gear ratio;

the step of determining the appropriate range state further comprising shifting the transmission system into low range if a) the shift lever is on high rail or if a transition to high rail is detected and the shift position is in neutral, and b) the current range state is unknown and the engine overspeed test indicates a negative result, otherwise shifting the transmission system into high range.

12. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the speed signal being operable to indicate whether the vehicle is operating above a low speed latch; and means for controlling automatic range shift determinations if the vehicle speed is above the low speed latch and for shifting the transmission into low range if the vehicle speed is lower than the low speed latch.

13. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the position signal being operable to indicate a transition to one of at least two possible rail positions including high rail and low rail;

the determination of the appropriate range of the transmission system by the controller comprising shifting the transmission system into high range if a) the shift lever is on low rail or if the position signal indicates a transition to low rail and the shift lever position is in neutral, and b) the transmission system is in low range and an overspeed test indicates a positive result.

14. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically, determining an appropriate one of a low range and a high range of the transmission system based on the selected target gear ratio; and a range shift mechanism for shifting the transmission system into the appropriate range automatically determined by the control logic;

the position signal being operable to indicate a transition to one of at least two possible rail positions including high rail and low rail;

the determination of the appropriate range by the controller comprising shifting the transmission system into low range if a) the shift lever is on low rail or if the position signal indicates a transition to low rail and the shift lever position is in neutral, and b) the transmission system is in high range and the overspeed test indicates a negative result.

15. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the position signal being operable to indicate a transition to one of at least two possible rail positions including high rail and low rail;

the determination of the appropriate range by the controller comprising shifting the transmission system into low range if a) the shift lever is on low rail or if a transition to low rail is detected and the shift lever position is in neutral, and b) the range is unknown and the overspeed test indicates a negative result, otherwise shifting the transmission system into high range.

16. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio;

a range shift mechanism for shifting the transmission system into the appropriate range automatically determined by the control logic;

the position signal being operable to indicate a transition to one of at least two possible rail positions including high rail and low rail;

the at least two possible ranges comprising a low range and a high range; and means for detecting a splitter select switch position; and if the transmission system is in low range and a) the splitter select switch indicates a splitter low position and the engine overspeed test for a first gear ratio is true, or b) the splitter select switch indicates a splitter high position and the engine overspeed test for a second gear ratio is true, then shifting the transmission system into high range.

17. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio;

the at least two possible range states comprising a low range and a high range; and means for detecting a splitter select switch position; and if the transmission system is in high range and a) the splitter select switch indicates a splitter low position and an engine engine overspeed test for a first gear ratio is false, or b) the splitter select switch indicates a splitter high position and the engine overspeed test for a second gear ratio is false, then shifting the transmission system into low range.

18. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the at least two possible range states comprising a low range and a high range; and means for detecting a spitter select switch position; and if the state is unknown and a) the splitter select switch indicates a splitter low position and an engine overspeed test for a first gear ratio is false, or b) the splitter select switch indicates a splitter high position and the engine overspeed test for a second gear ratio is false, then shifting the transmission system into low range, otherwise shifting the transmission system into high range.

19. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the position signal operable to indicate a transition to one of at least two possible rail positions including high rail and low rail;

the determination of the appropriate range comprising shifting the transmission system into low range if a) the shift lever is on high rail or if the position signal indicates a transition to high rail and the shift position is in neutral, and b) the transmission system is in high range and the overspeed test indicates a negative result.

20. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the position signal being operable to indicate a transition to one of at least two possible rail positions including high rail and low rail;

the determination of the appropriate range comprising shifting the transmission system into low range if a) the shift lever is on high rail or if the position signal indicates a transition to high rail and the shift position is in neutral, and b) the transmission system is in high range and the overspeed test indicates a negative result.

21. A manually shifted compound transmission system comprising:

a manually operated shift lever;

a position sensor for providing a position signal indicative of a position of the shift lever;

a force threshold detector for providing a shift knob force signal indicative of forces applied to the shift lever in a longitudinal direction;

a splitter select switch for engaging a selected splitter ratio and for providing a signal indicative thereof;

a speed sensor for providing signals indicative of engine rotational speed;

a controller including control logic for receiving input signals from the position sensor, the force threshold sensor, the splitter select switch, and the speed sensor to formulate an intent to shift signal and to determine a set of potential target gear ratios, the control logic executing engine overspeed tests to verify at least one of the set of potential target gear ratios, and automatically determining an appropriate one of a low range and a high range of the transmission system based on the selected target gear ratio; and a range shift mechanism for shifting the transmission system into the appropriate range automatically determined by the control logic;

the position signal being operable to indicate a transition to one of at least two possible rail positions including high rail and low rail;

the determination of the appropriate range comprising shifting the transmission system into low range if a) the shift lever is on high rail or if the position signal indicates a transition to high rail and the shift position is in neutral, and b) the current range state is unknown and the overspeed test indicates a negative result, otherwise shifting the transmission system into high range.

* * * * *

UNITED STATES PATENT AND TRADEMARK OFFICE
CERTIFICATE OF CORRECTION

PATENT NO.     : 6,979,279 B2
DATED          : December 27, 2005
INVENTOR(S)    : Douglas A. Hughes et al.

It is certified that error appears in the above-identified patent and that said Letters Patent is hereby corrected as shown below:

Column 8,
Line 6, delete "near" and insert -- gear --.

Column 16,
Line 57, delete "shifting the transmission system into low range . . . negative result." and insert -- maintaining the transmission system in low range if a) the shift lever is on high rail or if the position signal indicates a transition to high rail and the shift position is in neutral, and b) the transmission system is currently in low range. --.

Signed and Sealed this

Fourteenth Day of March, 2006

JON W. DUDAS
*Director of the United States Patent and Trademark Office*